United States Patent
Okita et al.

(10) Patent No.: US 7,808,199 B2
(45) Date of Patent: Oct. 5, 2010

(54) CONTROL APPARATUS

(75) Inventors: Tadashi Okita, Yamanashi (JP); Yukio Toyozawa, Yamanashi (JP); Naoto Sonoda, Yamanashi (JP)

(73) Assignee: Fanuc Ltd (JP)

(*) Notice: Subject to any disclaimer, the term of this patent is extended or adjusted under 35 U.S.C. 154(b) by 295 days.

(21) Appl. No.: 12/146,007

(22) Filed: Jun. 25, 2008

(65) Prior Publication Data
US 2009/0009128 A1    Jan. 8, 2009

(30) Foreign Application Priority Data
Jul. 2, 2007 (JP) ............... 2007-174296

(51) Int. Cl.
*G05B 13/02* (2006.01)

(52) U.S. Cl. ............. 318/619; 318/611; 318/621; 318/568.22; 700/188

(58) Field of Classification Search ........ 318/619, 318/611, 621, 568.22; 700/188
See application file for complete search history.

(56) References Cited

U.S. PATENT DOCUMENTS

| | | | |
|---|---|---|---|
| 3,970,897 A * | 7/1976 | Tamir et al. | 361/23 |
| 4,195,265 A | 3/1980 | Vali | |
| 6,507,165 B2 * | 1/2003 | Kato et al. | 318/611 |
| 2002/0016648 A1 * | 2/2002 | Fujita et al. | 700/188 |
| 2006/0108961 A1 | 5/2006 | Takemori et al. | |

FOREIGN PATENT DOCUMENTS

| | | |
|---|---|---|
| EP | 0685779 A1 | 12/1995 |
| EP | 1132790 A1 | 9/2001 |
| JP | 7-261853 | 10/1995 |
| JP | 2000056806 A | 2/2000 |
| JP | 2001-293638 | 10/2001 |
| JP | 2004215455 A | 7/2004 |

OTHER PUBLICATIONS

Notice of Reasons for Rejection for JP2007-174296 mailed Oct. 7, 2008.
European Search Report of Application No. 08011541.3-2206 / 2012206 mailed Mar. 5, 2010.

* cited by examiner

*Primary Examiner*—Paul Ip
(74) *Attorney, Agent, or Firm*—Lowe Hauptman Ham & Berner, LLP

(57) ABSTRACT

A control apparatus of the present invention comprising a control unit outputting a control signal controlling a servo motor and suppressing natural vibration of a controlled object including a motor and a machine driven by the motor while controlling the controlled object, comprising a frequency analysis unit analyzing a frequency component included in a torque command, an analysis control unit controlling the start or stopping of the frequency analysis unit, a detection unit detecting a natural frequency of the controlled object from an analysis result of the frequency analysis unit, a-band rejection filter receiving as input the torque command, stripping the command of the natural frequency component, and outputting the resultant command to the motor through a current control unit and servo amplifier, and a filter characteristic setting unit setting the frequency to be stripped at the filter based on the natural frequency detected by the detection unit.

10 Claims, 7 Drawing Sheets

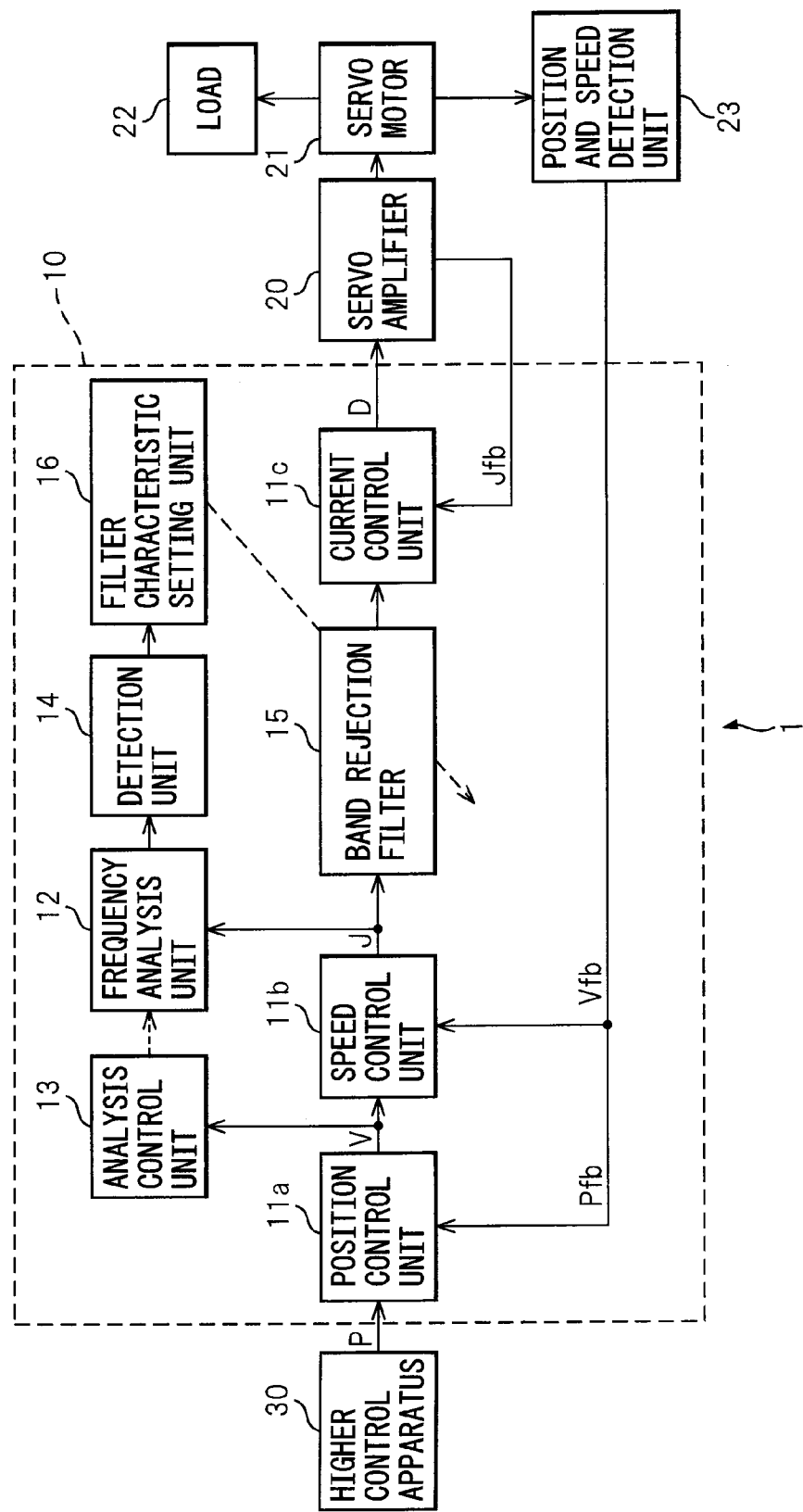

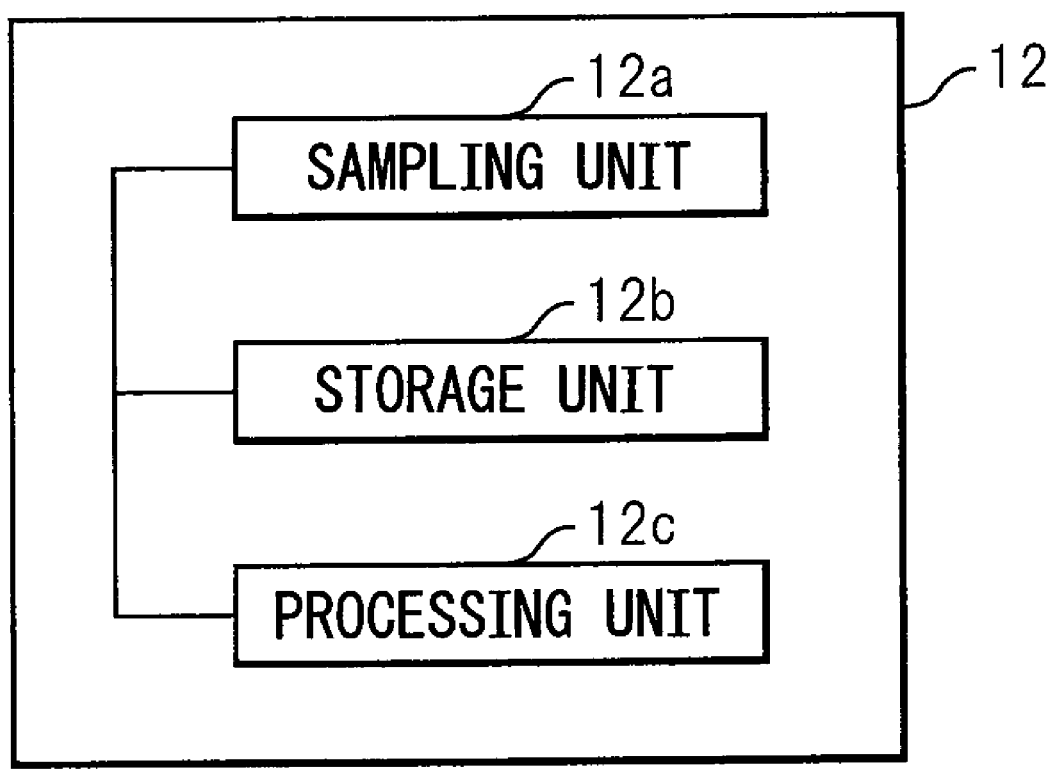

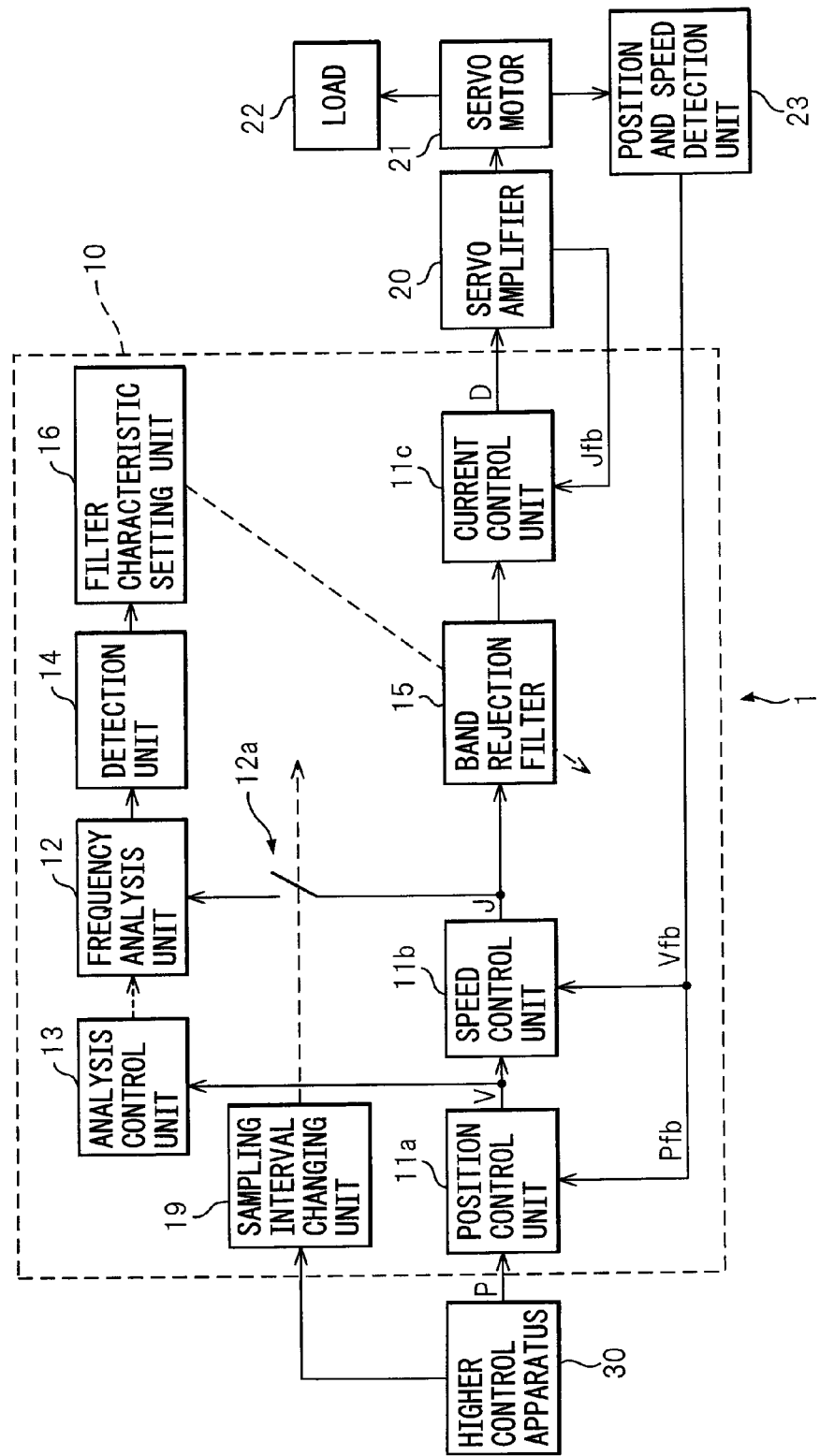

CONTROL APPARATUS

The applicant claims the right to priority based on Japanese Patent Application No. 2007-174296 filed on Jul. 2, 2007, the entire content of which is hereby incorporated by reference.

BACKGROUND OF THE INVENTION

1. Field of the Invention

The present invention relates to a control apparatus, more particularly relates to a control apparatus suppressing natural vibration of a controlled object including an electric motor and a machine driven by this electric motor while controlling the controlled object.

2. Description of the Related Art

In the past, machine tools equipped with electric motors have used control apparatuses for controlling the electric motors. In particular, a control apparatus using an electric motor, that is, a servo motor, for feedback control controls the difference between position, speed, current, and other command values and the actual values to become zero at all times. The machine position, motor speed, etc. are accurately controlled, so this is being widely employed in general CNC machine tools etc.

On the other hand, a controlled object including a servo motor and a machine driven by this servo motor is a physical dynamic system having elasticity, friction, mass, etc. When its rigidity or attenuation characteristic is low etc., sometimes the controlled object will resonate at the natural frequency and vibration having a large amplitude will occur.

Machines driven by servo motors, for example, include end effecters and workpieces held by hands and other end effecters. Further, if vibration occurs due to resonance, problems are liable to arise such as the machining precision of the machine tool falling or the held workpiece detaching from the hand.

Further, the natural frequency of the controlled object is not necessarily always constant and sometimes changes for the following reason. As the reason, first, sometimes the natural frequency changes depending on the machine position. Giving one example, in the axis of linear movement of a machine tool, when the drive source, that is, the servo motor, drives the driven object through a ball-screw mechanism, the spring constant of the ball-screw mechanism changes and the natural frequency changes between the case where the driven object is near the drive source and the case where it is far from the drive source.

Further, sometimes individual differences in machines result in changes in the natural frequency. Giving one example, mass produced machine tools, even when the same type of machine tools, individually differ to the assembly precision, the mass of the driven object, and other machine specifications and therefore differ in natural frequency.

Further, sometimes the natural frequency changes due to aging of the machine. Giving one example, the natural frequency changes due to wear on the sliding parts, the increase of rattling at the joints, etc. Further, sometimes the natural frequency changes depending on the rigidity of the held workpiece.

Further, a control apparatus reducing natural vibration has been proposed. For example, Japanese Patent Publication (A) No. 7-261853 and Japanese Patent Publication (A) No. 2001-293638 propose a control apparatus removing the natural frequency component from a control signal by a filter so as to reduce the vibration due to resonance.

The control apparatus described in Japanese Patent Publication (A) No. 7-261853 and Japanese Patent Publication (A) No. 2001-293638 continuously detects the natural frequency of the controlled object, changes the frequency which the filter removes in accordance with the detected natural frequency, and thereby prevents the controlled object from resonating.

However, with just continuously detecting the position of the controlled object etc. and detecting the natural frequency of the controlled object as in the control apparatus described in Japanese Patent Publication (A) No. 7-261853 or Japanese Patent Publication (A) No. 2001-293638, due to the following reasons, sometimes it is not possible to accurately detect the natural frequency affecting the operation of the controlled object. The reason is first that sometimes the apparatus detects a large amplitude other than natural vibration of the controlled object such as motor cogging, machining reaction force during machining, etc. and mistakenly judges that frequency to be the natural frequency.

Further, when the controlled object has several natural frequencies, first it is preferable to eliminate the natural vibration having the frequency closest to the control band. This is because the vibration far from the frequency of the control band, but largest in amplitude is sometimes detected as the natural frequency to be removed by the filter.

Further, depending on the state of the controlled object, sometimes no resonance occurs due to the natural frequency, so even if trying to detect it, sometimes it is not possible to detect the natural frequency of the controlled object.

Further, in processing for reducing the natural vibration of a controlled object, sometimes the controlled object is made unstable. As one example, when not able to detect the accurate natural frequency, but detecting the mistaken natural frequency and changing the settings of the filter accordingly, sometimes the controlled object becomes unstable. As another example, even if detecting the accurate natural frequency, when the natural frequency is close to the control band, sometimes the filter strips part of the signal of the control band so again the controlled object becomes unstable.

Still further, there is a demand that the control apparatus stably control the control object under conditions of a limited storage capacity of the apparatus and limited time for control processing.

These are issues which should be dealt with after the control apparatus accurately detects the natural frequency of the controlled object.

As explained above, further improvements are hoped for so as to reduce the resonance due to the natural frequency in a control apparatus controlling a controlled object including an electric motor etc.

SUMMARY OF THE INVENTION

Therefore, an object of the present invention is to provide a control apparatus accurately detecting a natural frequency of a controlled object driven by an electric motor and reducing natural vibration of the controlled object.

To achieve this object, the control apparatus according to the present invention has a control unit outputting a control signal controlling an electric motor and suppresses natural vibration of a controlled object including the electric motor and a machine driven by the electric motor while controlling the controlled object, the apparatus comprising a frequency analysis unit analyzing a frequency included in the control signal; an analysis control unit controlling the start or stopping of the frequency analysis unit; a detection unit detecting a natural frequency of the controlled object from an analysis result of the frequency analysis unit; a band rejection filter receiving as input the control signal, stripping the control signal of the natural frequency component, and outputting the resultant control signal to the electric motor; and a filter characteristic setting unit setting the frequency to be stripped at the band rejection filter based on the natural frequency detected by the detection unit.

Further, in the control apparatus according to the present invention, preferably the control signal is a speed command or torque command, and the analysis control unit controls the frequency analysis unit based on the value of the speed command or the torque command.

Further, in the control apparatus according to the present invention, preferably the apparatus comprises a higher control apparatus controlling the control unit and the analysis control unit, and the analysis control unit makes the frequency analysis unit analyze the frequency when the higher control apparatus outputs a start command to the analysis control unit.

Further, in the control apparatus according to the present invention, preferably the apparatus further comprises a natural vibration generation unit adding the natural frequency component to the control signal.

Further, in the control apparatus according to the present invention, preferably the detection unit detects the natural frequency from a predetermined range of frequency in the analysis result.

Further, in the control apparatus according to the present invention, preferably the detection unit detects a frequency with a magnitude of a frequency component of a predetermined threshold value or more from the analysis result as the natural frequency and changes the predetermined threshold value based on the natural frequency.

Further, in the control apparatus according to the present invention, preferably the apparatus comprises a control signal limiting unit limiting the magnitude of the control signal, and the control signal limiting unit limits the magnitude of the control signal for a predetermined time after the filter characteristic setting unit sets the frequency stripped by the band rejection filter.

Further, in the control apparatus according to the present invention, preferably the filter characteristic setting unit changes the amount of attenuation of the band rejection filter based on the natural frequency detected by the detection unit.

Further, in the control apparatus according to the present invention, preferably the filter characteristic setting unit changes the bandwidth of the frequency stripped by the band rejection filter based on the natural frequency detected by the detection unit.

Further, in the control apparatus according to the present invention, the frequency analysis unit comprises a sampling unit sampling the control signal at predetermined intervals, a storage unit storing the sampled control signals, and a processing unit applying a discrete Fourier transform to the stored control signals to calculate a frequency component. The control apparatus preferably comprises a sampling interval changing unit changing the predetermined interval by which the sampling unit samples the signals.

According to the above explained control apparatus of the present invention, it is possible to accurately detect the natural frequency of the controlled object driven by the electric motor and reduce the natural vibration of the controlled object.

Note that the terms used in the claims are not limited to the specific meanings described in the specification (for example, the embodiments).

DESCRIPTION OF THE DRAWINGS

These and other features and advantages of the present invention will be better understood by reading the following detailed description, taken together with the drawings, wherein:

FIG. 1A is a block diagram showing a control apparatus of a first embodiment of the present invention;

FIG. 1B is a block diagram of a frequency analysis unit of FIG. 1A;

FIG. 8 is a block diagram showing a control apparatus of an eighth embodiment of the present invention;

DESCRIPTION OF THE PREFERRED EMBODIMENTS

Figure 2:
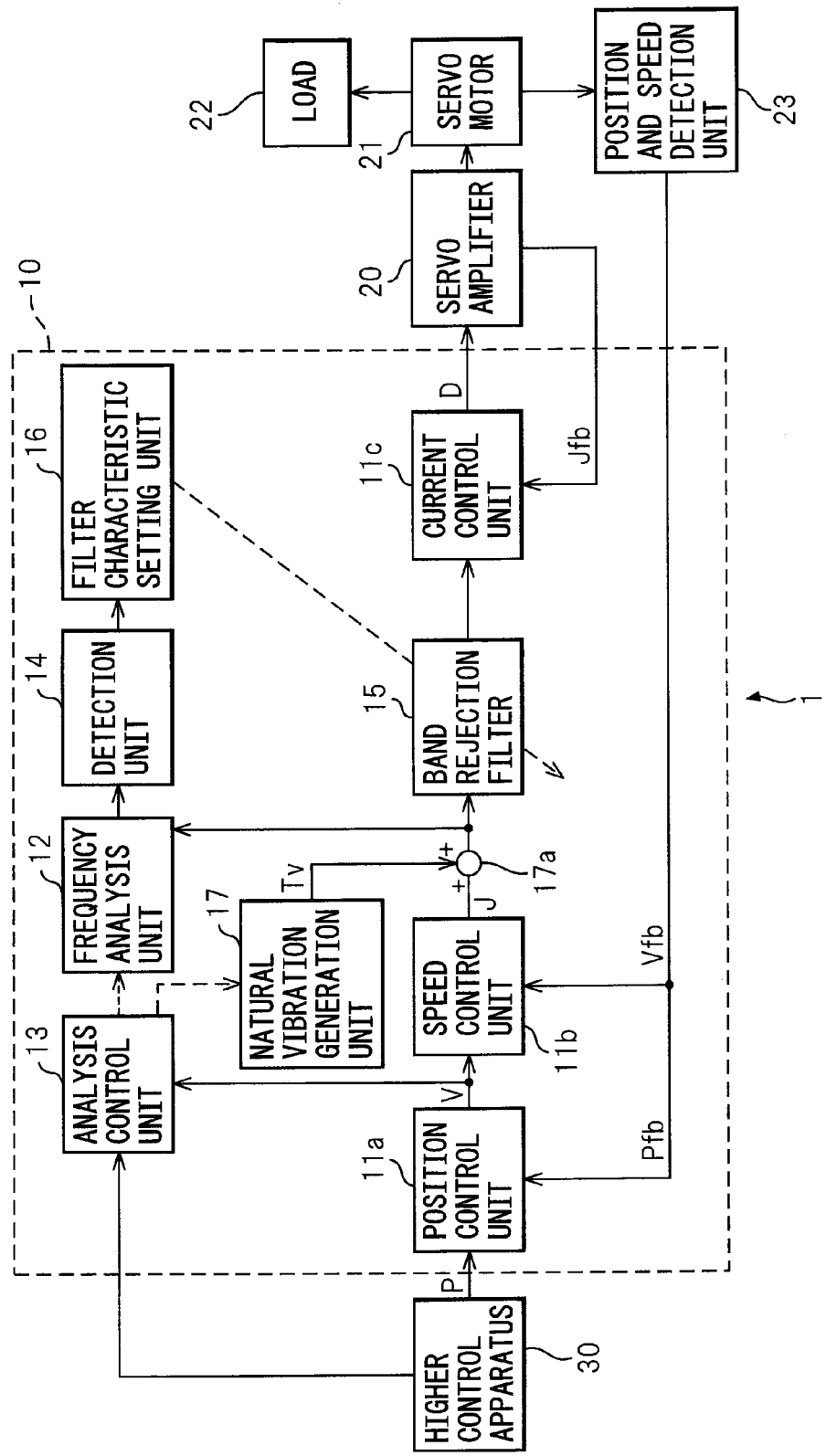
FIG. 2 is a block diagram showing a control apparatus of a second embodiment of the present invention.

Below, the control apparatus of the present invention will be explained based on preferred embodiments while referring to the drawings. However, note that the present invention is not limited by the following explanation and that it extends to the aspects of the invention described in the claims and their equivalents.

First Embodiment

The control apparatus 10 of the first embodiment of the present invention (below, also referred to as the "present apparatus 10") is a control apparatus of a machine tool 1. As shown in FIG. 1A, it receives a control signal from a higher control apparatus 30, that is, a position command P, controls the electric motor of the servo motor 21 through a servo amplifier 20, and drives the driven part, that is, the load 22, to control the operation.

The present apparatus 10, as shown in FIG. 1A, has a control unit outputting a control signal controlling a servo motor 21 and suppresses natural vibration of the controlled object, including the servo motor 21 and machine driven by the servo motor 21, while controlling the controlled object. Further, the present apparatus 10 has a frequency analysis unit 12 analyzing a frequency included in a control signal of a torque command, an analysis control unit 13 controlling the start or stopping of the frequency analysis unit 12, a detection unit 14 detecting a natural frequency of the controlled object from an analysis result of the frequency analysis unit 12; a band rejection filter 15 receiving as input the control signal of a torque command J, stripping the torque command J of the natural frequency component, and outputting the resultant torque command J to the servo motor 21, and a filter characteristic setting unit 16 setting the frequency to be stripped at the band rejection filter 15 based on the natural frequency detected by the detection unit 14.

The frequency analysis unit 12 of the present apparatus 10 analyzes the frequency component from the torque command. The frequency is the number of vibrations per second.

The controlled object of the present apparatus 10 includes the servo motor 21 and the load 22 driven by the servo motor 21. As the load 22, for example, an end effecter driven by the servo motor 21 or a workpiece gripped by the end effecter, that is, a hand, may be mentioned. Further, the position and speed of the spindle of the servo motor 21 are detected by a position and speed detection unit 23. The position and speed detection unit 23 feeds back the detected position and speed to the present apparatus 10.

The present apparatus 10 has a higher control apparatus 30 controlling the control unit. The higher control apparatus 30 outputs the position command P to the control unit of the present apparatus 10. As this higher control apparatus 30, for example, it is possible to use a CNC control apparatus or other known control apparatus.

The position command P output by the higher control apparatus 30 may also be an analog signal, but when a digital signal, the present apparatus 10 may be configured by digital circuits. Specifically, the hardware of the present apparatus 10 may be configured using a CPU or other processing device, semiconductor memory, magnetic storage device, optical storage device, or other storage device, input device, output device, and input/output interface.

Further, the present apparatus 10 will be explained below.

The present apparatus 10 has, as the control unit, as shown in FIG. 1A, a position control unit 11a, speed control unit 11b, and current control unit 11c as an acceleration control unit.

The position control unit 11a, as shown in FIG. 1A, receives as input the position command P output from the higher control apparatus 30 and the actual position detection value Pfb of the servo motor 21 fed back from the position and speed detection unit 23. The position control unit 11a outputs a speed command V reducing the positional difference P-Pfb comprised of the position command P minus the position detection value Pfb to the speed control unit 11b. As the method of this position control, for example, proportional control may be used.

Here, when natural vibration occurs in the controlled object, information of the position detection value Pfb including the amplitude of the natural vibration is also included in the positional difference P-Pfb, so the speed command V includes the natural frequency component.

Further, when vibration occurs in the controlled object due to motor cogging or machining reaction force during machining work etc., information of the position detection value Pfb including the amplitude is included in the positional difference P-Pfb as well, so the speed command V includes a vibration component having a large amplitude other than the natural vibration of the controlled object.

The speed control unit 11b, as shown in FIG. 1A, receives as input a speed command V output from the position control unit 11a and an actual speed detection value Vfb of the servo motor 21 fed back from the position and speed detection unit 23. The speed control unit 11b outputs a current command for reducing the speed difference V-Vfb comprised of the speed command V minus the speed detection value Vfb, that is, the torque command J, through the band rejection filter 15 to the current control unit 11c. As the method of this speed control, for example, proportional integral control may be used.

The current control unit 11c, as shown in FIG. 1A, receives as input the torque command J output from the speed control unit 11b through the band rejection filter 15 and the actual current detection value Jfb fed back from the servo amplifier 20. The current control unit 11c outputs a voltage command D so as to reduce the current difference J-Jfb comprised of the torque command J minus the actual current detection value Jfb to the servo amplifier 20.

The band rejection filter 15 receives as input the torque command J output from the speed control unit 11b. The band rejection filter 15 attenuates the frequency component in a predetermined bandwidth having the natural frequency of the controlled object as the center frequency from the input torque command J. Further, the band rejection filter 15 outputs the torque command J reducing the natural frequency component to the current control unit 11c.

The band rejection filter 15 preferably does not obstruct passage of the gain of the transfer function of the torque command J other than the natural frequency of the controlled object. This frequency band of the gain of the transfer function of the torque command J will also be referred to as the "control band" below.

The filter characteristics of the band rejection filter 15 can be determined by the center frequency, amount of attenuation, bandwidth, and other filter coefficients. The filter coefficients of the band rejection filter 15 are set or changed by the filter characteristic setting unit 16.

The servo amplifier 20 inputs the voltage command D and supplies the power for control to the servo motor 21. Further, the servo amplifier 20 detects the actual current detection value Jfb driving the servo motor 21 and feeds back the current detection value Jfb to the current control unit 11c.

The servo motor 21 is controlled by the power supplied from the servo amplifier 20 and drives the load 22. The actual position and speed of the spindle of the servo motor 21 are detected by the position and speed detection unit 23. The position and speed detection unit 23 feeds back the detected position detection value Pfb to the position control unit 11a and feeds back the detected speed detection value Vfb to the speed control unit 11b.

The controlled object including the servo motor 21 and the load 22 driven by this servo motor 21 is a physical dynamic system having elasticity, friction, mass, etc. When its rigidity or attenuation characteristic is low etc., sometimes the controlled object will resonate at the natural frequency and vibration having a large amplitude will occur.

Further, sometimes the controlled object of the machine tool 1 has several natural frequencies. When the controlled object has several natural frequencies, the natural vibration having the frequency closest to the control band generally has the greatest effect on the control precision or response of the controlled object.

Further, the natural frequency of the controlled object is not always constant and sometimes changes. As reasons for the change, the case of a change of the natural frequency dependent on the machine position, the case of a change of the natural frequency due to aging of the machine, the case of a change of the natural frequency depending on the rigidity of the workpiece held, etc. may be mentioned.

The present apparatus 10 is provided with the band rejection filter 15 to reduce the natural vibration of the controlled object of the machine tool 1. The natural frequency of the controlled object is detected by the analysis control unit 13, frequency analysis unit 12, and detection unit 14 in cooperation. Further, the filter characteristic setting unit 16 changes the filter characteristics of the band rejection filter 15 based on the detected natural frequency. Further, these will be explained below.

First, the analysis control unit 13 will be explained below. The analysis control unit 13, as shown in FIG. 1A, receives as input the speed command V output by the position control unit 11a in a branched manner. Here, as explained above, the control signal, that is, the speed command V, sometimes also includes a vibration component having a large amplitude other than the natural vibration of the controlled object. For example, when the speed of the spindle of the servo motor 21 is in a specific speed range, for example, when between the speeds V1 and V2, it is deemed that motor cogging occurs. In this case, if the speed command V is a value between V1 and V2, the servo motor 21 may be experiencing motor cogging and the frequency due to this motor cogging may be detected by the detection unit 14 as the natural frequency.

Therefore, in the present apparatus 10, to prevent the detection unit 14 from detecting vibration having a large amplitude other than the natural vibration of the controlled object as the natural vibration, the analysis control unit 13 controls the frequency analysis unit 12 based on the value of the speed command V.

Specifically, when the speed of the spindle of the servo motor 21 is between the speeds V1 and V2 and it is learned that motor cogging occurs, the analysis control unit 13 controls the frequency analysis unit 12 so as to stop the frequency analysis while the speed command V is between V1 and V2. That is, the analysis control unit 13 controls the frequency analysis unit 12 so as to analyze the frequency only when the speed command V is less than V1 or more than V2.

In the same way, in addition to vibration having a large amplitude due to machining by an end mill etc., when vibration having a large amplitude other than the natural vibration of a controlled object is known, the analysis control unit 13 controls the frequency analysis unit 12 so as to stop the frequency analysis in a specific range of the speed command where this vibration occurs.

Next, the frequency analysis unit 12 will be explained below. The frequency analysis unit 12, as shown in FIG. 1B, has a sampling unit 12a sampling the torque command J at predetermined intervals, a storage unit 12b storing the sample values of the sampled torque command J, and a processing unit 12c applying a discrete Fourier transform to the stored sample values of the torque command J to calculate the frequency component.

The frequency analysis unit 12 analyzes the frequency of the input torque command J and finds the frequency component included in the torque command J only when controlled by the analysis control unit 13 to analyze the frequency.

The sampling unit 12a of the frequency analysis unit 12, as shown in FIG. 1A, receives as input the torque command J output by the speed control unit 11b in a branched manner. The input torque command J is sampled by the sampling unit 12a at predetermined intervals. The sample values of the torque command J are stored in the storage unit 12b. The processing unit 12c applies a discrete Fourier transform to the sample values of the torque command J stored in the storage unit 12b to find the frequency component. The frequency analysis unit 12 outputs the analysis result, that is, the frequency component, to the detection unit 14.

The range of frequency which the frequency analysis unit 12 applies a discrete Fourier transform to and the number of sample values used for this discrete Fourier transform are set as predetermined values.

Next, the detection unit 14 will be explained below. The detection unit 14, as shown in FIG. 1A, receives as input the result of analysis of the frequency output from the frequency analysis unit 12. The detection unit 14 detects the frequency with a magnitude of the frequency component of a predetermined threshold value or more as the natural frequency from this analysis result. When the frequency component having a value of a predetermined threshold value or more has a peak shape, the maximal value of that peak is detected as the natural frequency.

When there are several of these natural frequencies, the detection unit 14 selects the natural frequency having a frequency closest to the control band. Further, the detection unit 14 outputs the detected or selected natural frequency to the filter characteristic setting unit 16.

Next, the filter characteristic setting unit 16 will be explained below. The filter characteristic setting unit 16 receives as input the natural frequency detected from the detection unit 14. The filter characteristic setting unit 16 changes the center frequency of the frequency component stripped by the band rejection filter 15 to match with the input natural frequency. Further, the filter characteristic setting unit 16 may change other filter coefficients in the band rejection filter 15, that is, the bandwidth or amount of attenuation, together with the center frequency.

The operation of the present apparatus 10 explained above will be explained above. The present apparatus 10 receives as input the position command P from the higher control apparatus 30 and controls the servo motor 21 by feedback control. The analysis control unit 13 controls the frequency analysis unit 12 to analyze the vibration or stop the analysis based on the input value of the speed command V so that the detection unit 14 does not detect a known vibration having a large amplitude other than the natural vibration of the controlled object as natural vibration. Further, when the detection unit 14 detects or selects a new natural frequency, the filter characteristic setting unit 16 changes the filter coefficient of the band rejection filter 15.

Further, the band rejection filter 15 changed in filter coefficient outputs a torque command stripped of the natural frequency component from the torque command J through the current control unit 11c and servo amplifier 20 to the servo motor 21, so natural vibration of a controlled object including a servo motor 21 and a machine driven by the servo motor 21 is prevented. As a result, the controlled object is stably controlled.

According to the control apparatus 10 of the above-mentioned embodiment, it is possible to accurately detect the natural frequency of the controlled object driven by the servo motor 21 and reduce the natural vibration of the controlled object. Specifically, the analysis control unit 13 controls the frequency analysis unit 12 so as not to detect known vibration having a large amplitude other than the natural vibration of the controlled object as natural vibration. It can prevent the detection unit 14 from mistakenly detecting the natural frequency.

Next, control apparatuses of other embodiments of the present invention will be explained below while referring to FIG. 2 to FIG. 8. For points not particularly explained in the other embodiments, the detailed explanations given regarding the first embodiment may be suitably applied. Further, in FIG. 2 to FIG. 8, components the same as in FIG. 1A or 1B are assigned the same notations.

Second Embodiment

The control apparatus 10 of the second embodiment of the present invention (below, also referred to as the "the present apparatus 10"), as shown in FIG. 2, has a higher control apparatus 30 controlling the analysis control unit 13. When the higher control apparatus 30 outputs a start command to the analysis control unit 13, the analysis control unit 13 makes the frequency analysis unit 12 analyze the frequency. The higher control apparatus 30 of the present apparatus 10, in the same way as the above first embodiment, outputs the position command P to the position control unit 11a and controls the analysis control unit 13.

Below, the present apparatus 10 will be explained further. When vibration having a large amplitude other than the natural vibration of the controlled object is known, the analysis control unit 13, in the same way as the first embodiment, controls the frequency analysis unit 12 so as not to detect this vibration as natural vibration. However, when vibration having a large amplitude other than the natural vibration of the controlled object is not known, the detection unit 14 may mistakenly detect the natural frequency.

On the other hand, the higher control apparatus 30 is positioned higher than the control unit of the present apparatus 10, so has a better grasp of the state of the controlled object. For example, in the middle of machining by an end mill, in the middle of mounting of a workpiece on an end effecter, or other state of the controlled object where the detection unit 14 may mistakenly detect the natural frequency can be grasped by the higher control apparatus 30. If the higher control apparatus 30 is for example a CNC control apparatus, the state of the controlled object can be judged based on a program etc.

Therefore, in the present apparatus 10, the higher control apparatus 30 controls the analysis control unit 13. Specifically, when the higher control apparatus 30 outputs a start command to the analysis control unit 13, the analysis control unit 13 make the frequency analysis unit 12 analyze the frequency.

For example, the higher control apparatus 30 can control the analysis control unit 13 so as to output a start command to the analysis control unit 13 only when feeding the load 22 fast. Further, when the end mill etc. is rotating during machining, the frequency due to this rotation may be detected by the detection unit 14 as the natural frequency, so the higher control apparatus 30 can output a stop command to the analysis control unit 13 and control the analysis control unit 13 so as to make the frequency analysis unit 12 stop the frequency analysis.

Here, when fast feeding the load 22 etc., even when the higher control apparatus 30 outputs a start command to the analysis control unit 13, in the known range of a specific speed command V where vibration occurs, the analysis control unit 13 controls the frequency analysis unit 12 to stop analysis of the frequency based on the value of this speed command. That is, the analysis control unit 13 receives as input the start command from the higher control apparatus 30 and makes the frequency analysis unit 12 analyze the frequency only when the input speed command V is in a known range where vibration is not caused.

Further, depending on the state of the controlled object, sometimes the natural frequency component included in the control signal is small or not included. In such a state, the detection unit 14 is liable to not be able to correctly detect the natural frequency.

Therefore, the present apparatus 10, as shown in FIG. 2, has a natural vibration generation unit 17 adding the natural frequency component of the controlled object to the control signal of the torque command J. The natural vibration generation unit 17 generates a signal Tv having a natural frequency component and, as shown in FIG. 2, outputs it to an adder unit 17a. The adder unit 17a adds the input signal Tv and torque command J and outputs the result to the band rejection filter 15. Further, when the control signal including the natural frequency component is input to the servo motor 21, natural vibration can be generated at the controlled object, so the detection unit 14 can detect the correct natural frequency.

Explaining this further, the controlled object sometimes has several natural frequencies. Further, natural frequencies sometimes change. Therefore, the natural vibration generation unit 17 outputs the signal Tv while changing its frequency by a predetermined range. As this signal Tv, for example, a swept sign may be used. Further, as the predetermined range of frequency, a range of 100 Hz to 1000 Hz may be used.

This natural vibration generation unit 17, in the same way as the frequency analysis unit 12, is controlled by the analysis control unit 13 to start or stop based on the value of the speed command V or the command of the higher control apparatus 30. The rest of the configuration is similar to that of the above-mentioned first embodiment.

According to the above-mentioned present apparatus 10, even when the vibration having a large amplitude other than the natural vibration of the controlled object is not known, it is possible to accurately detect the natural frequency of the controlled object and reduce the natural vibration of the controlled object. Further, even in a state where the natural frequency component included in the control signal is small or nonexistent, it is possible to accurately detect the natural frequency of the controlled object.

Third Embodiment

In the control apparatus 10 of the third embodiment of the present invention (below, also referred to as the "present apparatus 10"), the detection unit 14 detects the natural frequency of the controlled object from the predetermined frequency range in the analysis result of the frequency analysis unit 12.

Figure 3:
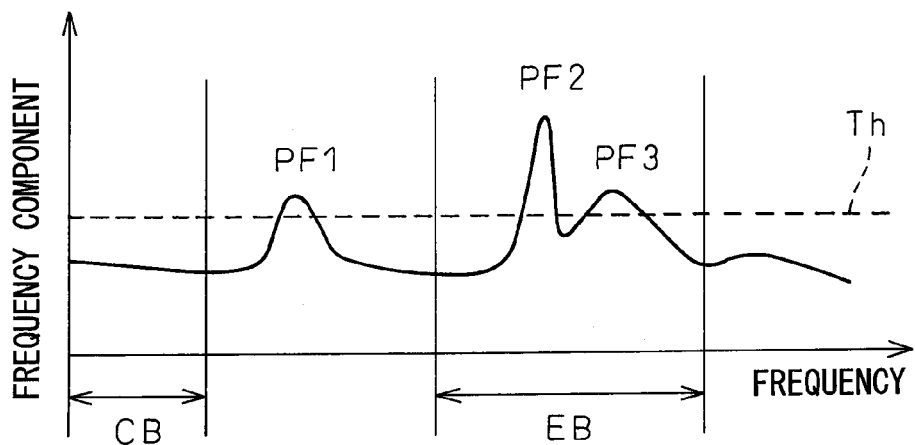
FIG. 3 is a view for explaining a detection unit in a control apparatus of a third embodiment of the present invention.

The present apparatus 10 will be explained below referring to FIG. 3. FIG. 3 shows an example of the analysis result of the frequency analysis unit 12. In FIG. 3, there are the peak PF1, peak PF2, and peak PF3. The magnitudes of the frequency components are at least the threshold value Th by which the detection unit 14 judges the frequency is a natural frequency. The threshold value Th, in the example shown in FIG. 3, has a certain value with respect to the frequency. Here, the peak PF1 and peak PF3 are the natural frequencies of the controlled object, while the peak PF2 is deemed known to be due to the motor cogging of the servo motor 21.

The fact that the peak PF2 is due to the vibration having a large amplitude other than the natural vibration of the controlled object is known, so the natural frequency corresponding to the peak PF2 is preferably stripped from the range of frequency by which the detection unit 14 detects the natural frequency from the viewpoint of the detection unit 14 efficiently performing the detection processing.

Therefore, in the present apparatus 10, the detection unit 14 detects the natural frequency of the controlled object from the frequency range minus the excluded frequency band EB including the natural frequency corresponding to the peak PF2.

Further, in the example shown in FIG. 3, the controlled object has two natural frequencies. In this case, from the viewpoint of the control precision and response, it is preferable to reduce the natural vibration corresponding to the peak PF1 having a frequency close to the control band CB preferentially over the natural vibration corresponding to the peak PF3.

Therefore, in the present apparatus 10, since the natural vibration present in the frequency domain away from the control band CB has little effect on the controlled object, the detection unit 14 detects the natural frequency of the controlled object from the frequency range minus the excluded frequency band EB of the frequency domain higher than the control band CB. As a result, the natural vibration corresponding to the peak PF3 included in the excluded frequency band EB is not detected by the detection unit 14.

Therefore, in the example shown in FIG. 3, the detection unit 14 of the present apparatus 10 detects only the natural vibration corresponding to the peak PF1 having a frequency near the control band CB. The rest of the configuration is similar to that of the above-mentioned first embodiment.

According to the above-mentioned present apparatus 10, it is possible to efficiently detect the natural frequency having an effect on the operation of the controlled object. Further, it is possible to prevent natural vibration having a frequency close to the control band CB and secure control precision and response of the controlled object.

Fourth Embodiment

Figure 4:
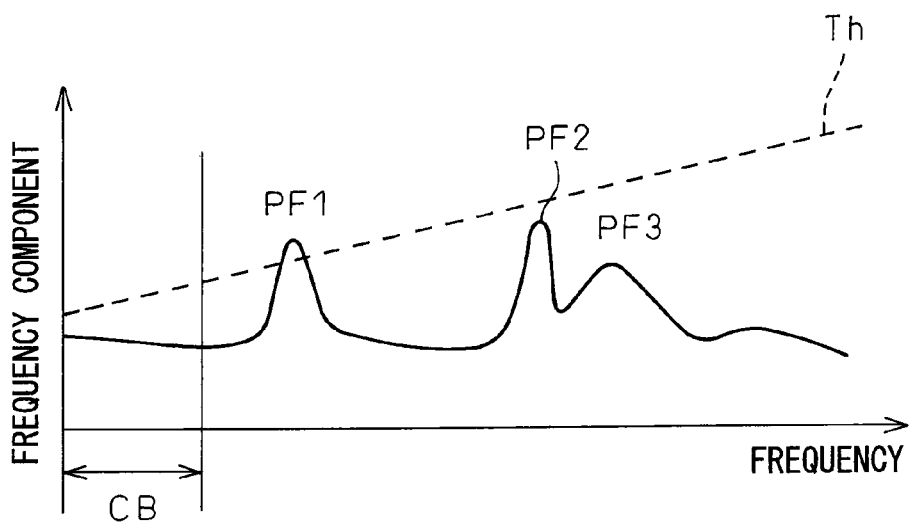
FIG. 4 is a view for explaining a detection unit in a control apparatus of a fourth embodiment of the present invention.

In the control apparatus 10 of the fourth embodiment of the present invention (below, also referred to as the "present apparatus 10"), the detection unit 14 detects a frequency with a magnitude of the frequency component of a threshold value Th or more from the analysis result of the frequency analysis unit 12 as the natural frequency. As shown in FIG. 4, it changes this threshold value Th based on the natural frequency.

The present apparatus 10 will be explained below with reference to FIG. 4. FIG. 4 shows an example of the analysis result of the frequency analysis unit 12. In FIG. 4, there are the peak PF1, peak PF2, and peak PF3. Here, the peak PF1 and peak PF3 are natural frequencies of the controlled object, while the peak PF2 is deemed known to be due to motor cogging of the servo motor 21.

The peak PF2 is known to be due to vibration having a large amplitude other than the natural vibration of the controlled object, so the natural frequency corresponding to the peak PF2 is preferably removed from the range of frequency by which the detection unit 14 detects the natural frequency from the viewpoint of the detection unit 14 efficiently performing the detection processing.

Therefore, the detection unit 14 of the present apparatus 10 changes the threshold value Th so as to increase together with the frequency. At the natural frequency corresponding to the peak PF2, the threshold value Th was made larger than the magnitude of the frequency component of the peak PF2.

Further, in the example shown in FIG. 4, the controlled object has two natural frequencies. In this case, from the viewpoint of the control precision and response, it is preferable to reduce the natural vibration corresponding to the peak PF1 having a frequency close to the control band CB preferentially over the natural vibration corresponding to the peak PF3.

Therefore, in the present apparatus 10, the natural vibration present in a frequency domain far from the control band CB has little effect on the controlled object, so the threshold value Th is changed to increase along with the increase of the frequency so that the threshold value Th in the high frequency domain becomes larger than the threshold value Th in the control band CB of the detection unit 14 of the present apparatus 10.

Therefore, in the example shown in FIG. 4, the detection unit 14 of the present apparatus 10 detects only the natural vibration corresponding to the peak PF1 having a frequency close to the control band CB. The rest of the configuration is similar to that of the above-mentioned first embodiment.

According to the above-mentioned present apparatus 10, similar effects are obtained as in the above third embodiment.

Fifth Embodiment

Figure 5:
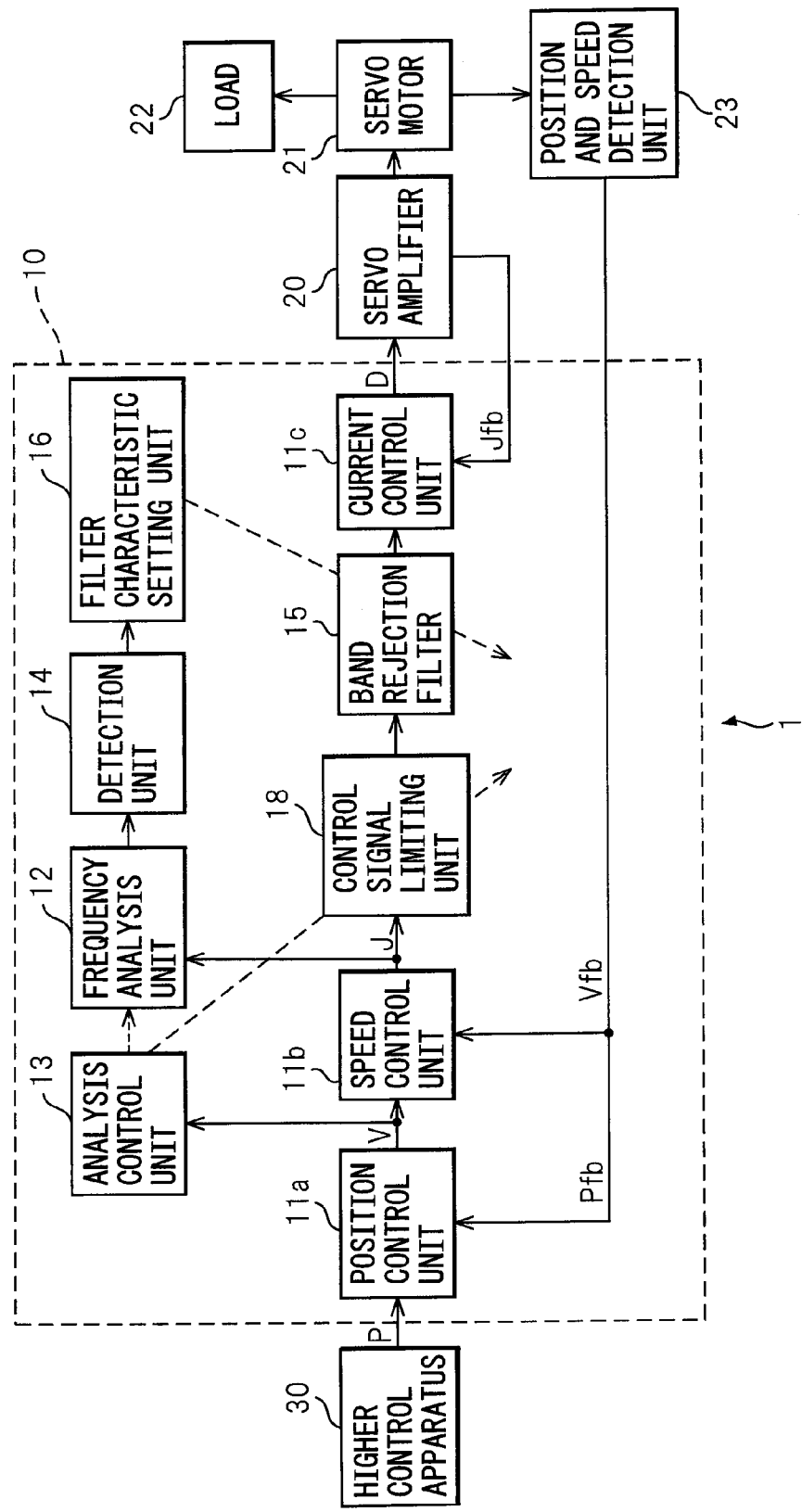
FIG. 5 is a block diagram showing a control apparatus of a fifth embodiment of the present invention.

The control apparatus 10 of the fifth embodiment of the present invention (below, also referred to as the "present apparatus 10"), as shown in FIG. 5, has a control signal limiting unit 18 limiting and attenuating the magnitude of the command signal, that is, the torque command J. The control signal limiting unit 18 limits and attenuates the magnitude of the torque command J for a predetermined period after the filter characteristic setting unit 16 sets the frequency to be stripped by the band rejection filter 15.

In the present apparatus 10, in the same way as the above-mentioned first embodiment, the frequency analysis unit 12 controlled by the analysis control unit 13 analyzes the torque command J, and the detection unit 14 finds the natural frequency. In accordance with the result, the filter characteristic setting unit 16 changes the filter characteristics of the band rejection filter 15. This process is repeated. As a result, it is possible to deal with changes in the natural frequency of the controlled object, so the controlled object can be controlled to be stable.

However, due to the effects of external disturbances other than the machine tool 1, sometimes the detection unit 14 mistakenly detects a vibration having a large amplitude other than the natural vibration of the controlled object as the natural frequency. In this case, the control signal including the natural frequency component continues to be output to the servo motor 21, so the controlled object may change unstably. If the instability of the controlled object increases, the servo motor 21 or load 22 is liable to be damaged.

Therefore, in the present apparatus 10, the predetermined period after the filter characteristic setting unit 16 sets the frequency for stripping by the band rejection filter 15 is provided for the case of detecting the mistaken natural frequency. The magnitude of the torque command J is limited and attenuated. Even if the detection unit 14 detects the mistaken natural frequency, by making the magnitude of the torque command J smaller, it is possible to reduce the resonance due to the natural frequency and possible to prevent the controlled object from rapidly becoming unstable.

As the rate by which the control signal limiting unit 18 limits the torque command, for example, it is preferable to reduce the control signal in the range of 10% to 90%. The specific rate of reduction is preferably suitably set in accordance with the state of the actual controlled object. Further, the predetermined period during which the control signal limiting unit 18 limits and attenuates the magnitude of the torque command J similarly is preferably suitably set in accordance with the state of the actual controlled object.

The control signal limiting unit 18 is controlled by the analysis control unit 13. Further, the control signal limiting unit 18 may be controlled by the filter characteristic setting unit 16.

According to the above-mentioned present apparatus 10, even when the detection unit 14 detects the mistaken natural frequency, it is possible to prevent the controlled object from becoming rapidly unstable and prevent the controlled object from being damaged.

Sixth Embodiment

In the control apparatus 10 of the sixth embodiment of the present invention (below, also referred to as the "the present apparatus 10"), the filter characteristic setting unit 16 changes the amount of attenuation of the band rejection filter 15 based on the natural frequency detected by the detection unit 14.

For example, in FIG. 3 used in the explanation of the third embodiment, the band rejection filter 15 reduces the natural vibration corresponding to the peak PF1. The band rejection filter 15 attenuates the frequency component at a predetermined bandwidth centered about the natural frequency, so when the natural frequency is present in the frequency domain close to the control band CB like the peak PF1, depending on the bandwidth of the band rejection filter 15, the gain of the control band is sometimes attenuated.

In this way, depending on the position of the natural frequency and the amount of attenuation or bandwidth of the band rejection filter 15, the band rejection filter 15 sometimes attenuates the gain of the control band. If the gain of the control band is attenuated by the band rejection filter 15, the control precision and response fall and the controlled object is liable to unstably change.

Figure 6:
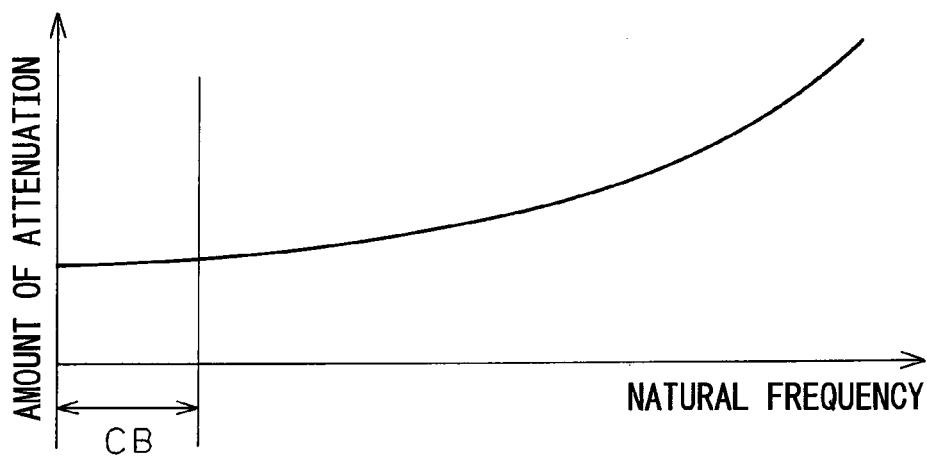
FIG. 6 is a view for explaining a filter characteristic setting unit in a control apparatus of a sixth embodiment of the present invention.

Therefore, in the present apparatus 10, as shown in FIG. 6, the amount of attenuation is changed so that the amount of attenuation of the band rejection filter 15 increases along with the increase of the natural frequency detected by the detection unit 14. That is, the amount of attenuation of the band rejection filter 15 is small in the low frequency domain close to the control band CB. On the other hand, it becomes larger in the high frequency domain away from the control band CB. The rest of the configuration is similar to that of the above-mentioned first embodiment.

According to the above-mentioned present apparatus 10, when the natural frequency is close to the control band CB, the amount of attenuation of the band rejection filter 15 is reduced to reduce the natural frequency component and prevent the gain of the control band CB from being overly reduced to thereby secure the safety of the controlled object. On the other hand, for the natural vibration in the frequency domain far from the control band CB, the amount of attenuation of the band rejection filter 15 is set large to reliably reduce the natural vibration.

Seventh Embodiment

In the control apparatus 10 of the seventh embodiment of the present invention (below, also referred to as the "present apparatus 10"), the filter characteristic setting unit 16 changes the bandwidth of the frequency stripped by the band rejection filter based on the natural frequency detected by the detection unit 14.

For example, in FIG. 3 used in the explanation of the third embodiment, the band rejection filter 15 reduces the natural vibration corresponding to the peak PF1. The band rejection filter 15 attenuates the frequency component in a predetermined bandwidth centered about the natural frequency, so when there is a natural frequency in the frequency domain close to the control band CB like with the peak PF1, depending on the bandwidth of the band rejection filter 15, sometimes the gain of the control band is attenuated.

In this way, depending on the position of the natural frequency and the amount of attenuation or bandwidth of the band rejection filter 15, sometimes the band rejection filter 15 attenuates the gain of the control band. If the gain of the control band is attenuated by the band rejection filter 15, the control precision and response are liable to fall and the controlled object is liable to become unstable.

Figure 7:
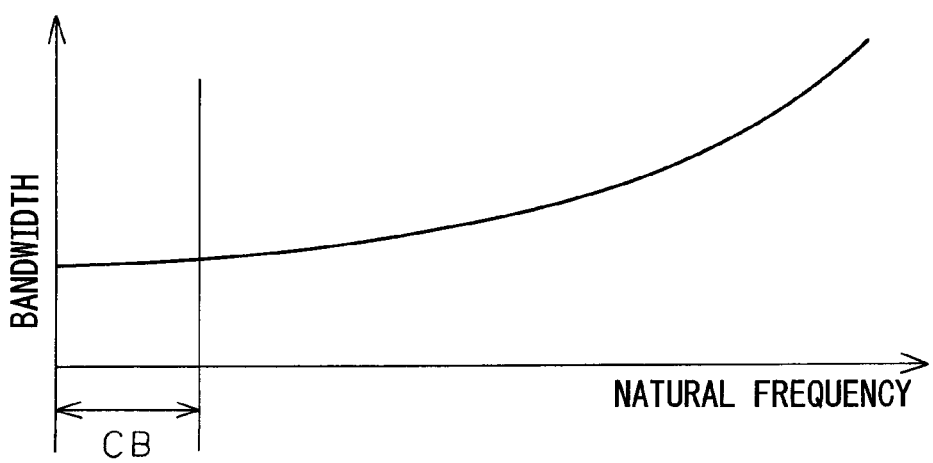
FIG. 7 is a view for explaining a filter characteristic setting unit in a control apparatus of a seventh embodiment of the present invention.

Therefore, in the present apparatus 10, as shown in FIG. 7, the bandwidth is changed so that the bandwidth of the band rejection filter 15 increases along with an increase of the natural frequency detected by the detection unit 14. That is, the bandwidth of the band rejection filter 15 is narrow in the low frequency domain close to the control band CB, while becomes broader in the high frequency domain far from the control band. The rest of the configuration is similar to that of the above-mentioned first embodiment.

According to the above-mentioned present apparatus 10, when the natural frequency is close to the control band CB, the bandwidth of the band rejection filter 15 is made narrower to reduce the natural frequency component and prevent the gain of the control band CB from being overly reduced, so the stability of the controlled object can be secured. On the other hand, for the natural vibration in the frequency domain far from the control band CB, the amount of attenuation of the band rejection filter 15 is set large to reliably reduce the natural vibration.

Eighth Embodiment

The control apparatus 10 of the eighth embodiment of the present invention (below, also referred to as the "the present apparatus 10"), as shown in FIG. 8, has a sampling interval changing unit 19 changing the predetermined interval at which the sampling unit 12a of the frequency analysis unit 12 samples the sample value. This sampling interval changing unit 19 is controlled by the higher control apparatus 30. Alternatively, the sampling interval changing unit 19 changes this in accordance with a predetermined routine.

The frequency analysis unit 12 analyzes the frequency of the torque command J and finds a predetermined range of frequency components. The range of frequency being analyzed covers the low frequency close to the control band to the high frequency far from the control band, so becomes a considerably wide range.

Further, the resolution of the frequency by which the detection unit 14 detects the natural frequency is preferably high from the viewpoint of finding the accurate natural frequency. Further, to raise the resolution of the frequency, it is necessary to shorten the interval by which the sampling unit 12a samples the torque command J. When sharply shortening the interval by which the sampling unit 12a samples the command, the number of sample values increases, so the storage capacity required in the storage unit 12b of the frequency analysis unit 12 increases. Further, the processing unit 12c of the frequency analysis unit 12 also increases the processing time required for applying a discrete Fourier transform. On the other hand, due to cost restrictions, in general a limit is placed on the storage capacity of the storage unit 12b. Further, from the viewpoint of the control response, the processing time for control is preferably short.

Therefore, in the present apparatus 10, to efficiently use the small storage capacity and detect the natural frequency with a good precision, the interval by which the sampling unit 12a samples the sample value was made variable. Further, as the routine for finding the natural frequency, first the interval by which the sampling unit 12a samples the values is increased, the sample values are sampled, then the natural frequency is found from a wide frequency range by a not high precision. Next, the interval by which the sampling unit 12a samples the values is shortened, the sample values are sampled, then the natural frequency is detected by a high precision from the narrow frequency range including the natural frequency found by the not high precision and the accurate natural frequency is found.

According to the above-mentioned present apparatus 10, it is possible to make the number of sample values in the case of finding the natural frequency by a not high precision from a wide frequency range and the number of sample values in the case of finding the natural frequency by a high precision from a narrow frequency range including the natural frequency found by the not high precision the same extent, so it is possible to efficiently use a small storage capacity to find the accurate natural frequency. Further, the frequency is not analyzed in the high resolution frequency range where the natural frequency is not present, so the processing unit 12c can reduce the processing time required for applying a discrete Fourier transform.

The control apparatus of the present invention is not limited to the above embodiments and can be suitably changed so long as not departing from the gist of the present invention. For example, in the above embodiments, the analysis control unit 13 controlled the frequency analysis unit 12 based on the value of the speed command, but the analysis control unit 13 may also control the frequency analysis unit 12 based on the value of the acceleration command (torque command) as a control signal.

Further, in the above embodiments, the band rejection filter 15 was arranged between the speed control unit 11b and current control unit 11c, but the band rejection filter 15 may also be arranged between the current control unit 11c and servo amplifier 20.

Further, the band rejection filter 15 may also be arranged at feedback of the speed detection value Vfb or feedback of the current detection value Jfb. In this case, the control signal prepared using the speed detection value Vfb or current detection value Jfb stripped of the natural frequency by the band rejection filter 15 is input to the servo motor 21.

Further, in the above embodiments, the analysis control unit 13 controlled the frequency analysis unit 12 based on the speed command output from the position control unit 11a, but the analysis control unit 13 may also control the frequency analysis unit 12 based on the value of the speed detection value Vfb or current detection value Jfb.

Further, in the above second embodiment, the analysis control unit 13 controlled the frequency analysis unit 12 based on control by the higher control apparatus 30 and the value of the speed command V, but the analysis control unit 13 may also control the frequency analysis unit 12 based on only control by the higher control apparatus 30.

The parts found only in single embodiments explained above may also all be suitably used with the other embodiments.

What is claimed is:

1. A control apparatus which suppresses natural vibration of a controlled object including an electric motor and a machine driven by said electric motor while controlling said controlled object, said control apparatus comprising:
   a control unit outputting a control signal controlling said electric motor;
   a frequency analysis unit analyzing a frequency included in said control signal;
   an analysis control unit controlling the start or stopping of said frequency analysis unit;
   a detection unit detecting a natural frequency of said controlled object from an analysis result of said frequency analysis unit;
   a band rejection filter receiving as input said control signal, stripping said control signal of said natural frequency component, and outputting the resultant control signal to said electric motor; and,
   a filter characteristic setting unit setting the frequency to be stripped at said band rejection filter based on said natural frequency detected by said detection unit.

2. The control apparatus as set forth in claim 1, wherein said control signal is a speed command or torque command, and
   said analysis control unit controls said frequency analysis unit based on the value of said speed command or said torque command.

3. The control apparatus as set forth in claim 1, wherein said apparatus comprises a higher control apparatus controlling said control unit and said analysis control unit, and
   said analysis control unit makes said frequency analysis unit analyze the frequency when said higher control apparatus outputs a start command to said analysis control unit.

4. The control apparatus as set forth in claim 1, further comprising
   a natural vibration generation unit adding said natural frequency component to said control signal.

5. The control apparatus as set forth in claim 1, wherein said detection unit detects said natural frequency from a predetermined range of frequency in said analysis result.

6. The control apparatus as set forth in claim 1, wherein said detection unit detects a frequency with a magnitude of a frequency component of a predetermined threshold value or more from said analysis result as said natural frequency and changes said predetermined threshold value based on said natural frequency.

7. The control apparatus as set forth in claim 1, wherein said apparatus comprises a control signal limiting unit limiting the magnitude of said control signal, and,
   said control signal limiting unit limits the magnitude of said control signal for a predetermined time after said filter characteristic setting unit sets said frequency stripped by said band rejection filter.

8. The control apparatus as set forth in claim 1, wherein said filter characteristic setting unit changes the amount of attenuation of said band rejection filter based on the natural frequency detected by said detection unit.

9. The control apparatus as set forth in claim 1, wherein said filter characteristic setting unit changes the bandwidth of the frequency stripped by said band rejection filter based on the natural frequency detected by said detection unit.

10. The control apparatus as set forth in claim 1, wherein said frequency analysis unit comprises a sampling unit sampling said control signal at predetermined intervals, a storage unit storing said sampled control signal, and a processing unit applying a discrete Fourier transform to said control signal to compute the frequency component, and
    said control apparatus comprises a sampling interval changing unit changing said predetermined interval by which said sampling unit samples the signals.

* * * * *